United States Patent [19]

Killat

[11] 4,395,306

[45] Jul. 26, 1983

[54] METHOD FOR PREPARING FIBROUS MATS FROM A FIBROUS SUSPENSION

[75] Inventor: George R. Killat, Midland, Mich.

[73] Assignee: The Dow Chemical Company, Midland, Mich.

[21] Appl. No.: 337,923

[22] Filed: Jan. 8, 1982

Related U.S. Application Data

[63] Continuation-in-part of Ser. No. 117,166, Jan. 31, 1980, abandoned.

[51] Int. Cl.$^3$ .............................................. C04B 43/02
[52] U.S. Cl. ................................. 162/156; 162/168.2; 162/168.3; 162/185; 428/273; 428/288; 428/290
[58] Field of Search ........... 162/145, 146, 156, 157 R, 162/168 N, 168 NA, 183, 185, 168.2, 168.3; 428/273, 288, 290

[56] References Cited

U.S. PATENT DOCUMENTS

| | | | |
|---|---|---|---|
| 3,391,057 | 7/1968 | Spence et al. | 162/168 NA |
| 3,630,831 | 12/1971 | Jongetjes | 162/167 |
| 3,752,733 | 8/1973 | Graham et al. | 162/168 R |
| 3,772,142 | 11/1973 | Doggett et al. | 162/168 |
| 3,976,824 | 8/1976 | Ariyoshi et al. | 162/168 NA |
| 3,988,503 | 10/1976 | Ariyoshi et al. | 162/168 NA |
| 4,049,491 | 9/1977 | Brandon et al. | 162/168 NA |
| 4,081,319 | 3/1978 | Conway | 162/168 NA |
| 4,199,643 | 4/1980 | Falgratore et al. | 428/290 |

Primary Examiner—James J. Bell

[57] ABSTRACT

Nonwoven mats or sheets having improved tensile strengths are prepared from a fibrous suspension of synthetic fibers thickened with a synthetic, addition polymer bearing pendant carboxamide groups and a cross-linking agent for the polymeric thickener. For example, a fibrous suspension comprising glass fibers, a polymer of acrylamide and a water-soluble hypohalite can be employed to prepare strong, glass fiber mats useful as effective reinforcement for roofing shingles.

16 Claims, No Drawings

METHOD FOR PREPARING FIBROUS MATS FROM A FIBROUS SUSPENSION

CROSS REFERENCE TO COPENDING APPLICATION

This application is a continuation-in-part of copending application U.S. Ser. No. 117,166 filed Jan. 31, 1980 now abandoned.

BACKGROUND OF THE INVENTION

The present invention relates to a method for preparing nonwoven, fibrous mats or sheets, particularly to a method wherein a fibrous mat or sheet is prepared from a suspension of synthetic fibers in an aqueous liquid.

Nonwoven fibrous mats or sheets prepared from synthetic fibers such as glass fibers are known to be effective reinforcement for a wide variety of products including roofing shingles, built-up roofing mats, battery walls and the like.

In the preparation of such nonwoven, fibrous mats or sheets employing conventional wet process (drift deposition) techniques, a suspension of the synthetic fibers and a suspending medium, which is typically an aqueous liquid, is deposited onto a continuous moving screen or other water-permeable support. The deposited fibrous mat is dewatered using drainage and suction; with additional amounts of water being subsequently removed using squeeze rolls, presses and/or drier's felt. Typically, to provide a mat with the desired physical properties such as tensile strength, a binder is applied to the fibers and the mat heated to cure the binder.

Using such wet process techniques, it is known that the properties such as tensile strength of the fibrous mats are affected by the properties of the fibrous suspension (e.g., the uniformity of distribution of the fibers in suspension and the settling rate of the fibers from suspension) employed in the mat's preparation. For example, the mats which generally exhibit the most desirable balance of uniformity and strength properties are prepared from fibrous suspensions wherein individual fibers are uniformly distributed (i.e., suspended) throughout the suspending medium. Unfortunately, there is a tendency for the synthetic fibers to entangle or agglomerate in the suspension thereby impairing the uniformity of the fibrous mat prepared therefrom.

Heretofore, to help achieve and maintain a desired suspension, it has been suggested that the fibrous suspensions comprise a dispersant or surface active agent to help reduce the entanglement of the fibers. For example, U.S. Pat. No. 3,772,142 teaches the use of a water-soluble polymer of an N-sulfohydrocarbyl acrylamide as a fiber dispersant. Unfortunately, the disentanglement of fibers resulting from the dispersant or surface active agent is generally not sufficient to impart the desired uniformity to the fibrous mats prepared from a suspension containing such dispersant or surface active agent.

Alternatively, U.S. Pat. No. 3,391,057 discloses that fibrous mats having improved uniformity can be prepared from an aqueous suspension of fibers and a water-soluble acrylamide polymer, which suspension may optionally contain a dispersant. While the mats prepared from such suspensions generally exhibit improved uniformity with an attendant increase in tensile strength, further tensile strength increases are often desirable to provide stronger fibrous mats or to use shorter and/or less fibers to prepare mats of equivalent strength.

U.S. Pat. No. 3,630,831 teaches the use of a binding agent for nonwovens and necessitates the addition of yet another ingredient in the suspension medium beyond those needed to disperse and/or suspend the fibers. As noted in the *Manual of Nonwovens*, Radko Krcma, an increase in foreign materials in the slurry decreases strength of the fiber sheet. It can be shown that although viscosity of the suspension controls the formation of the sheet, the higher amount of thickener needed to achieve that viscosity, the more interference in fiber binding. Although the majority of the thickened media is removed from the fibers during processing, a portion remains entrapped between fibers. This entrapped thickener increases water sensitivity at the fiber/fiber contact and therefore decreases wet strength.

In view of the stated deficiencies of the prior art, it remains highly desirable to provide fibrous mats or sheets having the desired uniformity and strength properties.

Summary of the Invention

Accordingly, in one aspect, the present invention is an improved method for preparing a fibrous mat or sheet from a thickened fibrous suspension of synthetic fibers and an aqueous suspending medium thickened with a synthetic, carboxamide polymer. The improvement in said method comprises reacting the thickener with an amount of a hypohalite water-soluble cross-linking agent for the polymeric thickener sufficient to increase the tensile strength of the fibrous mat or sheet.

In another aspect, the present invention is a thickened, fibrous suspension comprising an aqueous suspension of synthetic fibers thickened with a synthetic, carboxamide polymer and an amount of a water-soluble hypohalite cross-linking agent for the polymeric thickener such that the fibrous mats or sheets prepared from the thickened, fibrous suspension exhibit increased tensile strengths.

The synthetic, carboxamide polymeric thickener helps prevent the entanglement of fibers in suspension and control the settling rate of the fibers from suspension. Therefore, the fibrous mats prepared therefrom exhibit excellent uniformity. Surprisingly, by employing a hypohalite cross-linking agent for the polymeric thickener in conjunction therewith, the fibrous mats further exhibit an increased tensile strength.

The fibrous mats or sheets prepared by the method of the present invention are effectively employed as reinforcement for a variety of articles including roofing shingles, roofing mats, battery walls and the like.

DETAILED DESCRIPTION OF THE ILLUSTRATIVE EMBODIMENTS

As used herein, the term "fibrous suspension" refers to a suspension of synthetic fibers in a suspending medium of an aqueous liquid (herein referred to as "aqueous suspending medium"). The term "synthetic fiber" is used conventionally herein and refers to those synthetic materials having a relatively high tenacity, i.e., at least about 2 g pr denier, and a high length to breadth (diameter) ratio, i.e., the average length of the material is at least about 100 times the average diameter. By "synthetic" it is meant that the fibers are synthesized from simple chemical molecules, with said term including inorganic substances extruded in fibrous form and regenerated fibers. Representative materials useful as synthetic fibers in the practice of this invention include glass, rayon, graphite, polyamides (e.g., nylon and aramid), polyesters, polyolefins (e.g., polyethylene and polypropylene), polyvinyl chloride and the like. Advantageously, such materials have an average length of at least about 6 mm, more advantageously at least about 7.5 mm and a length to breadth ratio of at least about 400, more advantageously at least about 600. In addition, the materials advantageously have a moisture content of less than about 12 weight percent at 21° C. and 65 percent relative humidity. Preferably, glass fibers, particularly glass fibers having a length of at least about 8 mm, more preferably at least about 10 mm, and a length to breadth ratio of at least about 500, more preferably at least about 750, are employed in the practice of this invention.

The term "aqueous suspending medium" refers to the normally liquid material or materials which serve as the suspending medium for the synthetic fibers. In general, water is the preferred suspending agent. Alternatively, but, in general, less preferred, the suspending medium can consist of water and a water-miscible liquid such as a lower alkanol, e.g., methanol, ethanol or propanol, a lower ketone such as acetone or methyl ethyl ketone; or dimethylene glycol methyl ether. Such water-miscible liquids are employed in amounts which are insufficient to cause the precipitation of the water-soluble polymer which thickens the fibrous suspension.

The amount of synthetic fibers and aqueous suspending medium most advantageously employed in preparing the fibrous suspension is dependent on a variety of factors including the type of fiber and aqueous suspending medium employed and the desired properties of the fibrous mats prepared therefrom. Typically, the fibrous suspension will comprise from about 0.01 to about 20.0, preferably from about 0.05 to about 10, more preferably from about 0.1 to about 5, weight percent of fibers and from about 80 to about 99.99, preferably from about 90 to about 99.95, more preferably from about 95 to about 99.9, weight percent of the aqueous suspending medium, said weight percentages being based on the weight of the fibers and aqueous suspending medium.

In the practice of this invention, a synthetic, carboxamide polymer is employed to thicken the fibrous suspension. By the term "synthetic, addition polymer" is meant a polymer formed by the direct attachment or combination of monomer molecules as later defined with one another. Typically, such combination is due to the ethylenic unsaturation of the monomer molecules and the resulting polymers are polyethylenic.

Synthetic, carboxamide polymers suitably employed herein are water-soluble polymers which are soluble in (or miscible with) the aqueous suspending medium in an amount sufficient to measurably increase the viscosity of, i.e., thicken, the fibrous suspension. Hereinafter, such synthetic, addition polymers will be referred to as "polymeric thickeners." Polymers which are "soluble" (which term includes miscible) in the suspending medium, are polymers which form a true solution therein, i.e., individual polymer molecules are dispersed throughout the suspending medium. Advantageously, at least about 0.005, preferably at least about 0.01, most preferably at least about 1, weight percent of the polymer is soluble in the suspending medium, based on the weight of the suspending medium. By "thicken the fibrous suspension" it is meant that the viscosity of the suspending medium is increased by an amount which is measurable using conventional techniques, e.g., a Brookfield viscometer, Model LVT, UL adaptor, at 6 rpm and 25° C., following the addition of the synthetic, addition polymer. Advantageously, the polymeric thickener increases the viscosity of the fibrous suspension by at least 200, more advantageously at least about 600, percent when employed in an amount of about 0.1 weight percent based on the weight of the suspending medium. Synthetic, addition polymers preferably employed as the polymeric thickeners herein are those polymers which sufficiently increase the viscosity of water such that at about 1250, more preferably at about 1000, most preferably at about 800, parts of polymer per million parts by weight of water, the viscosity of the water-polymer solution is about 10 cps.

In the normal practice of this invention, a water-soluble polymer of an ethylenically unsaturated carboxamide such as acrylamide, methacrylamide, fumaramide, ethacrylamide, and the like; or an N-substituted ethylenically unsaturated carboxamide such as N-alkyl-substituted acrylamide (e.g., N-methyl acrylamide) and N-substituted (N', N'-dialkylaminoalkyl)acrylamide (e.g., N-substituted (N', N'-dimethylaminomethyl)acrylamide) which N-substituted amide is generally the Mannich reaction product of polyacrylamide and their salts (e.g., N-(dimethylaminomethyl)methacrylamide hydrochloride). Included among the water soluble copolymers are those of one or more such carboxamide monomers with one or more other ethylenically unsaturated monomers such as sulfoalkyl esters of an ethylenically unsaturated carboxylic acid, e.g., 2-sulfoethyl methacrylate; quaternized derivatives of an N-substituted (N', N'-dialkylaminoalkyl)acrylamide, e.g., N-(trimethylammoniumethyl)acrylamide chloride; aminoalkyl esters of an ethylenically unsaturated carboxylic acid, e.g., 2-aminoethyl methacrylate; vinyl sulfonates, e.g., vinylbenzene sulfonate and the ammonium or alkali metal lsalts thereof; α, β-ethylenically unsaturated carboxylic acids such as acrylic or methacrylic acid and their water-soluble salts, particularly alkali metal salts, e.g., sodium acrylate; or dimethyl aminoethyl methacrylate or the quaternized derivative thereof are employed herein.

Polymers of an ethylenically unsaturated carboxamide wherein at least about 50, advantageously at least about 70, more advantageously at least about 85, mole percent of the polymerized monomer units bear pendant groups which are unsubstituted carboxamide groups or N-substituted carboxamide groups of the formula:

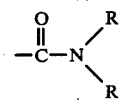

wherein each R is individually hydrogen, alkyl or aminoalkyl, particularly dialkylaminomethyl, are especially useful, particularly wherein the remainder of the polymerized monomer units bear pendant carboxylic groups, i.e.,

wherein M is hydrogen or a monovalent cation such as ammonium or an alkali metal. Each R may be hydrogen, alkyl or dialkylaminoalkyl. In the especially useful carboxamide polymers, each R is hydrogen or dialkylaminomethyl. Most preferably, polyacrylamide or the Mannich reaction product thereof is employed as the polymeric thickener herein.

In general, to impart the desired viscosity increases to the suspending medium at sufficiently low concentrations, the polymeric thickeners useful herein possess relatively high molecular weights. For example, the preferred polymers, either homopolymers or copolymers derived from an ethylenically unsaturated carboxamide have a weight average molecular weight of at least about 1,000,000, preferably at least about 5,000,000.

In the practice of this invention, the fibrous suspension is advantageously thickened with an amount of the polymeric thickener such that the fibrous mats of sheets prepared from the thickened, fibrous suspension exhibit improved uniformity when compared to fibrous mats prepared from a fibrous suspension having no thickener therein. In general, uniformity of the fibrous mat is a measure of the distribution of the fibers throughout the mat or sheet. Nonuniformity is evidenced by roping, clumping or the twisting together of individual fibers throughout the length and width of the mat or sheet. By "improved uniformity" it is meant that such variations in a fibrous mat prepared from the thickened, fibrous suspension of this invention are less than the variations in a fibrous mat prepared from an identical fibrous solution which contains no thickener. Such differences in variations can generally be observed by visual inspection of the fibrous mats. Quantitatively, such improved uniformity is evidenced by decreased variations in physical property measurements such as tensile strength and light transmittance.

In general, the amount of the polymeric thickener most advantageously employed herein depends primarily on the viscosity desired in the fibrous suspension. The viscosity of the fibrous suspension will vary with a variety of factors including the type and amount of the fiber and the suspending medium and the specific polymeric thickener employed. In general, the fibrous suspension advantageously exhibits a viscosity from about 1.5 to about 400, more advantageously from about 2 to about 20, most advantageously from about 4 to about 15, cps when measured by the techniques hereinbefore exemplified. To obtain such viscosities, the polymeric thickener is advantageously employed in an amount from about 0.001 to about 1.0, more advantageously from about 0.002 to about 0.2, most advantageously from about 0.005 to about 0.1, weight percent based on the weight of the aqueous suspending medium. With the preferred glass fibers, the thickened fibrous suspension advantageously exhibits a viscosity from about 2 to about 20, more advantageously from about 6 to about 12, cps. To obtain such viscosity, the polymers derived from the ethylenically unsaturated carboxamides are advantageously employed in amounts from about 0.002 to about 0.2, preferably from about 0.005 to about 0.1, weight percent of the fibrous suspension.

Water-soluble, cross-linking agents for the various polymeric thickeners useful herein are the hypohalites, e.g. ammonium or alkali metal hypobromite or hypochlorite. Those cross-linking agents are capable of cross-linking the polymeric thickener at the conditions, e.g., temperature, and concentration employed in the preparation of the fibrous mats. Preferably, when employed at the amounts hereinafter specified, the cross-linking agents sufficiently cross-link the polymer at a temperature of less than about 50° C., more preferably at less than about 40° C., most preferably at ambient temperatures, e.g., from about 18° to about 25° C., in a relatively short period, e.g., less than about 10, preferably less than about 5, minutes, to increase the tensile strength of the resulting fibrous mats.

The hypohalites, particularly an alkali metal hypochlorite are advantageously employed as cross-linking agents for the polymers bearing N-substituted carboxamide groups wherein the substituent group is an aminoalkyl group, e.g., N-substituted (N', N'-dialkylamino)acrylamide.

The cross-linking agent for the polymeric thickener is employed in amounts such that the tensile strength of a fibrous mat prepared by the improved method of this invention, i.e., wherein the fibers retain a cross-linking agent and polymeric thickener, is measurably greater than a fibrous mat prepared in an identical manner except no cross-linking agent for the polymeric thickener is employed when said tensile strengths are measured using conventional techniques, e.g., see Note 3 in Table I of Example 1, following the application of a binder to the fibrous mats. Advantageously, the cross-linking agent is employed in an amount such that the viscosity of the thickened suspension is not affected and sufficient that the residual polymer has active groups that can be cross-linked. The dry tensile strength of fibrous mats prepared by the improved method of this invention, using a conventional binder of the condensation product of urea and formaldehyde, is increased by at least about 10, more preferably at least about 15, most preferably at least about 20, percent.

Typically, such amounts of cross-linking agent will vary depending on a variety of factors including the composition of the thickened, fibrous suspension and the specific cross-linking agent employed. Typically, the minimum amount of the cross-linking agent is dictated by the lowest desired tensile strength increase, whereas the maximum amount of the cross-linking agent is that maximum amount which does not precipitate the polymer from solution. In general, from about 0.01 to about 0.5, preferably from about 0.1 to about 0.25, equivalent of the cross-linking agent is employed per each equivalent of the polymeric thickener of the preferred molecular weight range.

In the practice of this invention, the fibers, aqueous suspending medium and polymeric thickener are combined to form the thickened, fibrous suspension. While the method for combining the ingredients is not particularly critical, the fibers are generally added to the aqueous suspending medium containing the polymeric thickener while agitating the suspending medium sufficiently to achieve an essentially uniform distribution of the fibers in the suspending medium. A suspending agent, i.e., surfactant, such as a diphenyl oxide sulfonate, e.g., sodium dodecyl diphenyl ether sulfonate; quaternized ammonium compounds, e.g., N-alkyltrimethyl ammonium chloride; or fatty acid partial esters of sorbitol anhydride, e.g., sorbitan monolaurate and sorbitan monostearate; or dispersants such as described in U.S. Pat. No. 3,772,142 can also be employed in the suspension. Alternatively, a fibrous suspension of the fibers, aqueous suspending medium and optional suspending aid can be prepared. The polymeric thickener, as a dilute solution in water or other liquid soluble in (or miscible with) the aqueous suspending medium, can then be added to the fibrous suspension while agitating the suspension sufficiently to maintain a uniform distribution of the fibers in suspension.

The cross-linking agent for the polymeric thickener may be applied to the fibers prior to the application of the binder. Advantageously, the cross-linking agent is added to the thickened fibrous suspension. Alternatively, the cross-linking agent can be applied directly to the fibrous mats such as by spraying an aqueous solution of the cross-linker on the dewatered mats. The cross-linking agent forms a reaction product with the carboxamide polymer, which as the residuum on the fibers, after removal of substantially all of the suspending medium, will cross-link during subsequent processing steps.

Fibrous mats or sheets are easily prepared from the thickened, fibrous suspension using conventional techniques well known in the art. Illustrative of such techniques are described in *Nonwoven Fabrics,* F. N. Buresh, published by Reinhold Publishing Company, New York, New York in 1962; *Manual of Nonwovens,* by Radko Krima, published in 1977 by the Textile Trade Press, Manchester, England; and U.S. Pat. Nos. 3,766,003; 3,752,733; 3,657,031; 3,720,578; 3,775,244 and 3,758,378; all of which references are hereby incorporated by reference. Typically, in preparing the fibrous mats from the thickened, fibrous suspension, the suspended fibers are deposited as a mat or sheet on a condensing unit of a water-permeable, fiber-impermeable support which support is generally a screen or similarly perforated material of the flat or drum type. A majority of the water in the wet laid fibrous mat is drained through the perforations in the support. A vacuum is often applied to the underside of the support to facilitate more complete removal of the aqueous suspending medium from the fibrous mat. In general, removal of the aqueous suspending medium by such conventional techniques causes the removal of a major part of the polymeric thickener from the fibrous mat, which solution of thickener and suspending medium can be recycled and employed in preparing subsequent thickened, fibrous suspensions. The dewatered fibrous mat contains a residuum of carboxamide polymer adhered to the fibers.

To provide the requisite integrity and strength to the fibrous mats, a binder is generally applied to the fibers. Materials useful as binders are well known in the art and reference is made thereto for the purposes of this invention. Illustrative of binders useful for a variety of the fibers suitably employed herein are disclosed in *Man-Made Fibers,* 6th Edition, by R. W. Moncrieff, published in 1975 by The Whitefriarts Press Ltd., London, Chapter 48, "Nonwoven Fabrics, Felts and Paper"; *Manual of Nonwovens* by Radko Krima, published in 1971 by the Textile Trade Press, Manchester, England, Chapter 8, "Adhesion and Bonding" and U.S. Pat. Nos. 3,752,733; 3,669,638; 3,657,031 and 3,120,467; which references are hereby incorporated by reference. In the practice of this invention, the binders most advantageously employed include those binders comprised of a condensation polymer of an aldehyde with phenol, urea or melamine, particularly the condensation product of urea with formaldehyde; aqueous dispersion of colloidal size particles (i.e., latexes) of polymerized ethylenically unsaturated carboxylic acids such as methyl methacrylate; monovinylidene aromatic monomers such as styrene; halo-substituted olefins such as vinyl chloride and vinylidene chloride; conjugated dienes such as butadiene; copolymers of the ethylenically unsaturated monomers such as styrene-butadiene or vinyl chloride-vinyl acetate copolymers; and the like. Preferably, the binder is based on the condensation polymer of urea and formaldehyde, particularly when used in conjunction with glass fibers and a polymeric thickener derived from an ethylenically unsaturated carboxamide. Generally, the binder, in the form of an aqueous solution or emulsion, is applied to the resulting fibrous mats or sheets by any of a variety of methods such as spraying the fibrous mats with the binder composition or dipping the mats in a bath of said composition. Following the application of the binder to the mats, the mats are generally heated to dry the fibers and to cure the binder. Typically, such curing conditions are determined by the binder composition employed, with temperatures from about 120° to about 180° C. generally being employed. At such temperatures, curing times generally range from about 5 to about 20 minutes.

The following examples are incorporated to illustrate the practice of this invention and should not be construed to limit its scope or application. In the examples, all parts and percentages are by weight unless otherwise indicated.

EXAMPLE 1

A thickened, aqueous suspension (Sample No. 1) is prepared by adding 9 g of water-soaked glass fibers sold as 670M Fiberglas ® by Owens-Corning to a suitable size vessel containing 5 liters of deionized water and sufficient amounts of a polymeric thickener of a polymer of N-(dimethylaminomethyl)acrylamide to prepare a solution having a viscosity of about 8.5 cps (as measured on a Brookfield viscometer, Model LVT with UL adaptor at 6 rpm and 25° C.), which requires about 560 parts of the polymeric thickener per million parts of the suspending medium. During said addition and for a three-minute period thereafter, the resulting mixture is agitated to achieve an essentially uniform distribution of the fibers throughout the suspension.

A fibrous sheet (Sample No. 1) is prepared from the thickened aqueous suspension by depositing the suspension on a water-permeable nylon screen of about 80 mesh (Tyler Sieve Series) covered with a water-permeable nylon scrim of about 20 mesh. The water is allowed to drain through the scrim and screen, with water removal being facilitated by applying suction to the underside of the screen. The resulting fibrous sheet is submerged in a binder composition of a 20 percent, by weight, aqueous solution of a condensation polymer of urea and formaldehyde. Upon removal of the sheet from the binder composition, excess amounts of binder are removed from the sheet. The mat is then heated for 15 minutes at 121° C. in a forced air oven to dry the sheet and thereafter heated for 15 additional minutes at 177° C. to cure the binder.

In an identical manner, a fibrous sheet (Sample No. 2) is prepared from a thickened, fibrous suspension identical in all respects to the suspension employed in the preparation of Sample No. 1 except that sodium hypochlorite, a cross-linking agent for the dimethylaminomethyl polyacrylamide, is added to the suspension in an amount of 15 parts of the hypochlorite per 100 parts of the acrylamide polymer, i.e., about 0.25 equivalents of the hypochlorite per equivalent of polymer.

As a control, fibrous mats are prepared from a fibrous suspension (Sample No. C) containing no thickener.

Each sample of the resulting fibrous sheets is tested for tensile strength and uniformity. The results of this testing are shown in Table I.

TABLE I

| Sample No. | Thickener, Type (1) | Cross-Linking Agent | Tens. Strength Lbs (2) | Relative Variance, % (3) | Uniformity (4) |
|---|---|---|---|---|---|
| C* | — | — | 12.2 | 53 | 1 |
| 1* | DCC | — | 21.6 | 13.1 | 3 |
| 2* | DCC | NaOCl | 28.7 | 7.3 | 3 |

*Not an example of this invention.
(1) DCC = a polymer of N—(dimethylaminomethyl)acrylamide wherein about 85 percent of the carboxamide groups are substituted and said polymer has a viscosity as a 7 percent aqueous solution of about 16,000 cps (Brookfield viscometer, Model LVT, Spindle No. 5, 20 rpm, 25° C.) and said solution has a pH of about 10.
(2) Tensile strength is the number average tensile strength of five 1" × 9" samples of the fibrous sheets which have been conditioned at least for about 24 hous at 25° C. and 43 percent relative humidity as determined by an Instron tester with a jaw gap of 6" and a cross-head speed of 1" per minute.
(3) Relative Variance refers to the relative variance exhibited when conducting the dry tensile testing. Relative variance is expressed as the standard deviation of the five samples used to obtain the dry tensile strength recorded in this Table divided by the mean of the tensile strengths of the samples. It is a measure of the uniformity of the fibrous sheets from each suspension, with the fibrous sheets exhibiting the lower values of relative variance being more uniform.
(4) Prior to applying the binder to the fibrous mat, each mat is examined to evaluate the uniformity of distribution of the fibers throughout the mat. A rating of 1 indicates substantial nonuniformity in said distribution as evidenced by areas which contained almost no fibers and other areas where the fibers were highly concentrated. A rating of 2 indicates numerous areas exist throughout the mat wherein the distribution of fibers was significantly higher or lower than the average throughout the mat. A rating of 3 indicates isolated areas existed throughout the mat which exhibited a nonuniform distribution of fibers.

As evidenced by the data recorded in Table I, the fibrous sheets prepared from a fibrous suspension thickened with synthetic, addition polymer and comprising a cross-linking agent for the polymeric thickener exhibit increased tensile strengths when compared to a fibrous mat prepared from a thickened fibrous suspension having no cross-linking agent added thereto and a fibrous, suspension comprising neither the polymeric thickener nor cross-linking agent.

EXAMPLE 2

Several thickened, fibrous suspensions (Samples Nos. 1–3) are prepared using a polymer of an N-(dimethylaminomethyl)acrylamide as the polymeric thickener in the various amounts specified in Table II. Similarly, several thickened fibrous suspensions (Samples Nos. 4–6) are prepared using the same polymeric thickener at the amounts specified in Table II and adding a sodium hypochlorite to the suspension. About 0.25 equivalents of said hypochlorite is added per equivalent of the polymeric thickener. As a control, a fibrous suspension (Sample No. C) is prepared having no thickener added thereto.

Fibrous sheets are prepared from each of the suspensions following the procedure of Example 1. The tensile strengths of the fibrous sheets are determined and the results are recorded in Table II.

TABLE II

| Sample No. | Thickener Conc., ppm (1) | Cross-linking Agent (2) Type | Cross-linking Agent (2) Wt. % | Tens. Strength Lbs (3) | Rel. Var., % (4) |
|---|---|---|---|---|---|
| C* | — | — | — | 12.2 | 53 |
| 1* | 200 | — | — | 24.3 | 30.2 |
| 2* | 400 | — | — | 24.8 | 30.1 |
| 3* | 600 | — | — | 22.5 | 26.5 |
| 4 | 200 | NaOCl | 15 | 29.3 | 15.8 |
| 5 | 400 | NaOCl | 15 | 27.0 | 24.9 |
| 6 | 600 | NaOCl | 15 | 30.9 | 4.2 |

*Not an example of the present invention.
(1) The concentration of each thickener is recorded as weight parts of thickener per million weight parts of the aqueous suspending medium.
(2) If employed, the type and amount of the cross-linking agent for the polymeric thickener is recorded, with weight percent being based on the weight of the polymeric thickener.
(3) Same as (2) in Table I except five samples were tested to obtain the number average value recorded in the Table.
(4) Same as (3) in Table I.

As evidenced by the data recorded in Table II, the amounts of the polymeric thickener influence the property of the fibrous mats prepared therefrom. In general, however, over the broad range of concentrations employed, the fibrous mats formed from the thickened, fibrous suspensions of this invention exhibit improved tensile strengths when compared to fibrous sheets prepared from a fibrous suspension which is not thickened. Moreover, the uniformity of such fibrous mats, as evidenced by the relative variance, is also improved. Importantly, the fibrous sheets prepared from the thickened, fibrous suspensions containing the cross-linking agent for the acrylamide polymer exhibit greater tensile strengths than those fibrous sheets prepared from the thickened, fibrous suspensions containing no cross-linking agent.

What is claimed is:

1. An improved method for preparing a fibrous mat or sheet by depositing a layer of a thickened fibrous suspension of synthetic fibers and an aqueous suspending medium thickened by a carboxamide synthetic addition polymer on a support, removing substantially all of said suspending medium to leave a fibrous mat with a residuum of a minor amount of said carboxamide polymer on the fibers, the improvement wherein said carboxamide polymer is reacted with a hypohalite to form a reaction product in said suspending medium, which as said residuum will cross-link to provide a fibrous mat of improved strength.

2. The improved method of claim 1 wherein the synthetic addition polymer is a water-soluble polymer of an ethylenically unsaturated carboxamide or an N-substituted ethylenically unsaturated carboxamide.

3. The improved method of claim 1 wherein the synthetic, addition polymer is derived from an ethylenically unsaturated carboxamide and the cross-linking agent is an ammonium or alkali metal hypohalite.

4. The improved method of claim 1 wherein the cross-linking agent is employed in an amount of from about 0.01 to about 0.5 equivalent per equivalent of the polymeric thickener.

5. The improved method of claim 2 wherein the N-substituted ethylenically unsaturated carboxamide is an N-substituted (N', N'-dialkylaminoalkyl)acrylamide.

6. The improved method of claim 5 wherein at least about 50 mole percent of the polymerized monomer units comprising the polymeric thickener bear pendant groups which are N-substituted carboxamides of the formula:

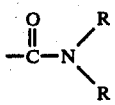

wherein R is individually hydrogen, alkyl, aminoalkyl or dialkylaminomethyl provided both R's are not hydrogen.

7. The improved method of claim 6 wherein each R is a dialkylaminomethyl group.

8. The improved method of claim 7 wherein each R is dimethylaminomethyl.

9. The improved method of claim 8 wherein the cross-linking agent is an ammonium or alkali metal hypochlorite and is employed in an amount of from about 0.01 to about 0.5 equivalent per equivalent of the polymeric thickener.

10. The method of claim 9 wherein the cross-linking agent is sodium hypochlorite.

11. The improved method of claim 1 wherein the fibrous mat or sheet is prepared from a thickened, fibrous suspension comprising synthetic fibers and an aqueous suspending medium thickened by a carboxamide polymer which suspension further comprises a cross-linking agent for the polymeric thickener, the cross-linking agent being in an amount which does not cause precipitation of the polymer.

12. The improved method of claim 1 wherein the fibers are contacted with the cross-linking agent for the polymeric thickener by spraying an aqueous solution of the cross-linking agent on the fibrous mat or sheet prepared from the thickened, fibrous suspension.

13. The improved method of claim 12 which further comprises applying a binder to the fibrous mat or sheet.

14. The improved method of claim 1 wherein said synthetic fibers are glass fibers.

15. A thickened, fibrous suspension comprising an aqueous suspension of synthetic fibers thickened with a synthetic carboxamide polymer and an amount of a water-soluble hypohalite cross-linking agent for the polymeric thickener such that a fibrous mat or sheet prepared from the thickened, fibrous suspension exhibit increased tensile strength.

16. The suspension of claim 15 wherein said fibers are glass fibers.

* * * * *